(12) United States Patent
Hiramoto

(10) Patent No.: US 12,050,949 B2
(45) Date of Patent: Jul. 30, 2024

(54) IMAGE FORMING APPARATUS, RECORDING AMOUNT SETTING METHOD OF IMAGE FORMING APPARATUS, AND RECORDING AMOUNT SETTING PROGRAM

(71) Applicant: KONICA MINOLTA, INC., Tokyo (JP)

(72) Inventor: Kenichirou Hiramoto, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/134,834

(22) Filed: Apr. 14, 2023

(65) Prior Publication Data
US 2023/0394264 A1 Dec. 7, 2023

(30) Foreign Application Priority Data
Jun. 1, 2022 (JP) .................................. 2022-089394

(51) Int. Cl.
*G06K 15/02* (2006.01)
*B41J 29/38* (2006.01)
*G03G 15/00* (2006.01)
*G06K 15/10* (2006.01)

(52) U.S. Cl.
CPC .......... *G06K 15/1876* (2013.01); *B41J 29/38* (2013.01); *G03G 15/50* (2013.01); *G06K 15/102* (2013.01)

(58) Field of Classification Search
CPC ... G06K 15/1876; G06K 15/102; B41J 29/38; G03G 15/50
See application file for complete search history.

(56) References Cited

U.S. PATENT DOCUMENTS

| | | | |
|---|---|---|---|
| 2016/0350627 A1* | 12/2016 | Kanda | G06K 15/1836 |
| 2021/0019582 A1* | 1/2021 | Nakagawa | G06K 15/1878 |
| 2021/0295121 A1* | 9/2021 | Hardy | G06K 15/1877 |
| 2022/0066372 A1* | 3/2022 | Ishizumi | G03G 15/5058 |

FOREIGN PATENT DOCUMENTS

JP 2007281870 A 10/2007

* cited by examiner

*Primary Examiner* — Iriana Cruz
(74) *Attorney, Agent, or Firm* — Holtz, Holtz & Volek PC

(57) ABSTRACT

An image forming apparatus includes: a hardware processor that quantizes each pixel with a dither pattern divided according to a resolution in a predetermined direction, and sets a recording amount of each pixel by adding up processing results of the quantization.

10 Claims, 16 Drawing Sheets

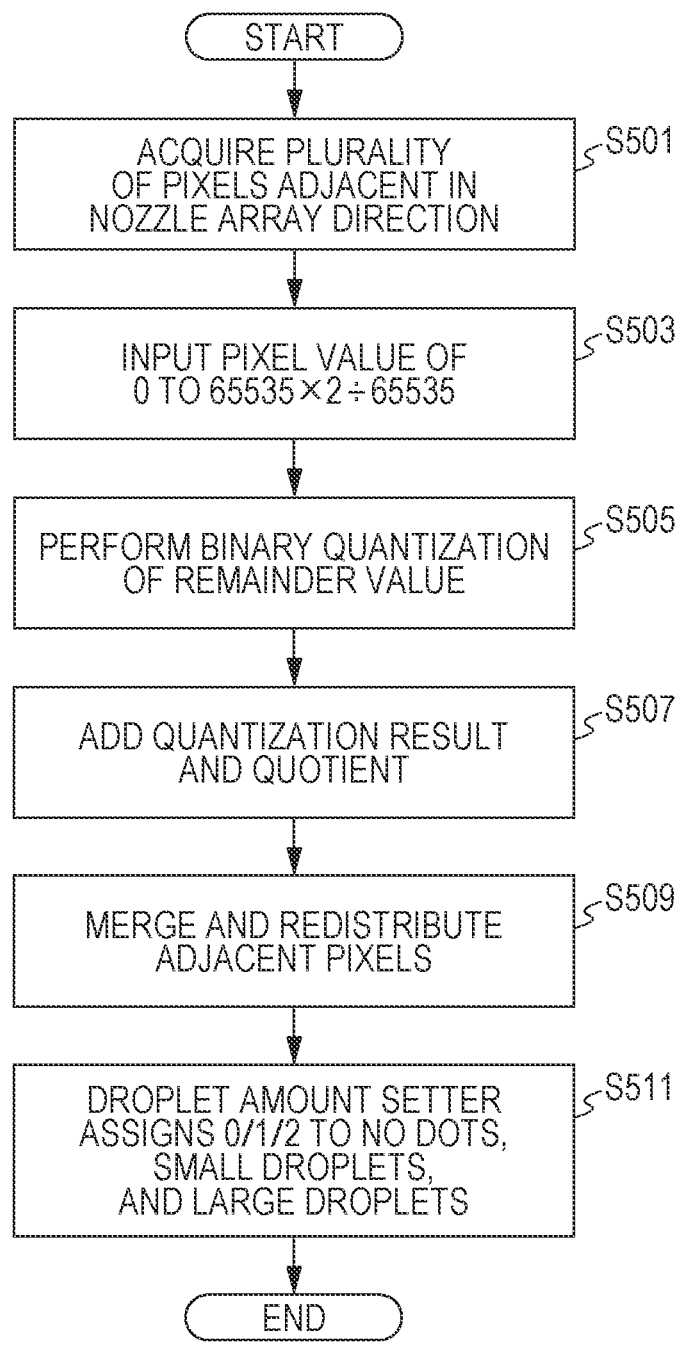

*FIG. 14A*

| P1 | P2 |
|---|---|
| 0 | 0 |
| 0 | 1 |
| 0 | 2 |
| 1 | 0 |
| 1 | 1 |
| 1 | 2 |
| 2 | 0 |
| 2 | 1 |
| 2 | 2 |

⇒

| P1a | P2a |
|---|---|
| 0 | 0 |
| 0 | 1 |
| 0 | 2 |
| 1 | 0 |
| 2 | 0 |
| 1 | 2 |
| 2 | 0 |
| 2 | 1 |
| 2 | 2 |

*FIG. 14B*

| P1 | P2 |
|---|---|
| 0 | 0 |
| 0 | 1 |
| 0 | 2 |
| 1 | 0 |
| 1 | 1 |
| 1 | 2 |
| 2 | 0 |
| 2 | 1 |
| 2 | 2 |

⇒

| P1a | P2a |
|---|---|
| 0 | 0 |
| 0 | 1 |
| 0 | 2 |
| 1 | 0 |
| 0 | 2 |
| 1 | 2 |
| 2 | 0 |
| 2 | 1 |
| 2 | 2 |

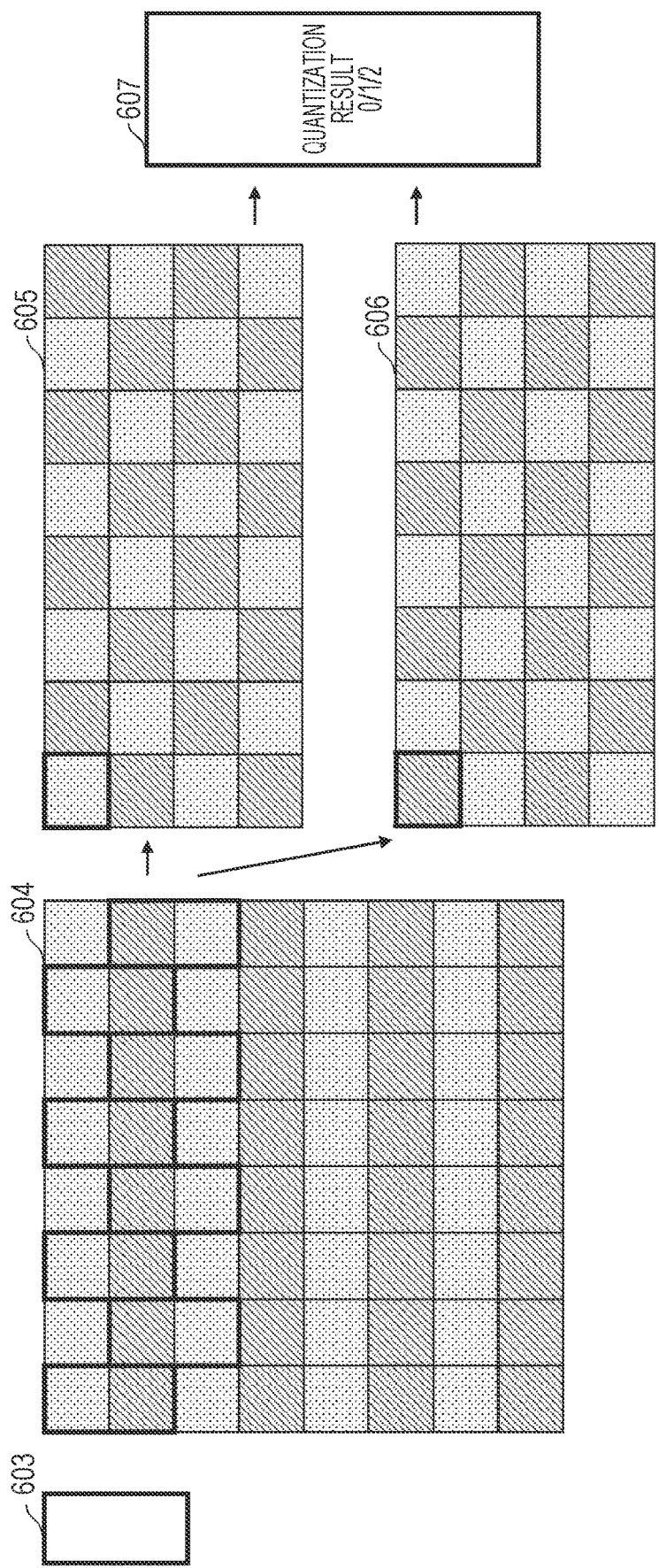

IMAGE FORMING APPARATUS, RECORDING AMOUNT SETTING METHOD OF IMAGE FORMING APPARATUS, AND RECORDING AMOUNT SETTING PROGRAM

The entire disclosure of Japanese patent Application No. 2022-089394, filed on Jun. 1, 2022, is incorporated herein by reference in its entirety.

BACKGROUND

Technological Field

The present invention relates to an image forming apparatus, a recording amount setting method of an image forming apparatus, and a recording amount setting program.

Description of the Related Art

As an example of printers, a single-pass type inkjet printer is known. A single-pass type inkjet printer performs printing once on a sheet to be conveyed with a head carriage being fixed.

JP 2007-281870 A describes a technique related to an inkjet printer.

The abstract of the image forming apparatus of JP 2007-281870 A describes "including: an output resolution ratio acquiring means 3 that acquires an aspect ratio of an output resolution when an image is formed on a medium; an input means 4 that inputs an input image value of a continuous tone in the image to be formed; a dithering processing means 5 that compares the input image value with a threshold value of a dither matrix held in advance to obtain a quantization value; and a pattern assigning means 6 that assigns a dot pattern based on the quantization value to create dot data, in which the dither matrix is optimally dot-dispersed with respect to a predetermined aspect ratio, the aspect ratio of resolution of the input image value matches the predetermined aspect ratio, and a size of the dot pattern is determined according to the resolution of the input image value and the output resolution".

In the image forming apparatus described in JP 2007-281870 A, it is necessary to prepare a corresponding dot pattern after quantization. Therefore, in order to apply the same dither matrix to a plurality of recording resolutions, it is necessary to prepare a dot pattern corresponding to each resolution after quantization, and the configuration becomes complicated.

SUMMARY

With regard to such a problem, an object of the present invention is to apply the same dither matrix to a plurality of recording resolutions with a simple configuration.

To achieve the abovementioned object, according to an aspect of the present invention, an image forming apparatus reflecting one aspect of the present invention comprises: a hardware processor that quantizes each pixel with a dither pattern divided according to a resolution in a predetermined direction, and sets a recording amount of each pixel by adding up processing results of the quantization.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 13 is a flowchart illustrating processing in which the inkjet recording apparatus according to the present embodiment further merges and redistributes adjacent pixels with respect to a fourth example of a second embodiment;

FIG. 14A is an explanatory diagram illustrating a concept of merging and redistributing adjacent pixels in step S509 (part 1];

FIG. 14B is an explanatory diagram illustrating a concept of merging and redistributing adjacent pixels in step S509 (part 2);

FIG. 16 is a conceptual diagram illustrating processing in which a quantization processor alternately shifts two divided virtual 1200×600 [dpi] dither patterns in a direction orthogonal to a conveyance direction, executes binary quantization, and then performs adding up.

DETAILED DESCRIPTION OF EMBODIMENTS

Hereinafter, one or more embodiments of the present invention will be described with reference to the drawings. The embodiments described below are examples for achieving the present invention, and should be appropriately corrected or changed according to the configuration of the apparatus to which the present invention is applied and various conditions. However, the scope of the invention is not limited to the disclosed embodiments.

Present Embodiment

[Overall Configuration of Image Forming Apparatus]

In the present embodiment, an inkjet recording apparatus 500 will be described as an example of an image forming apparatus. Note that, in the present embodiment, the inkjet recording apparatus 500 will be described, but it is not limited to the inkjet printer, and may be applied to, for example, an electrophotographic image forming apparatus.

Figure 1:
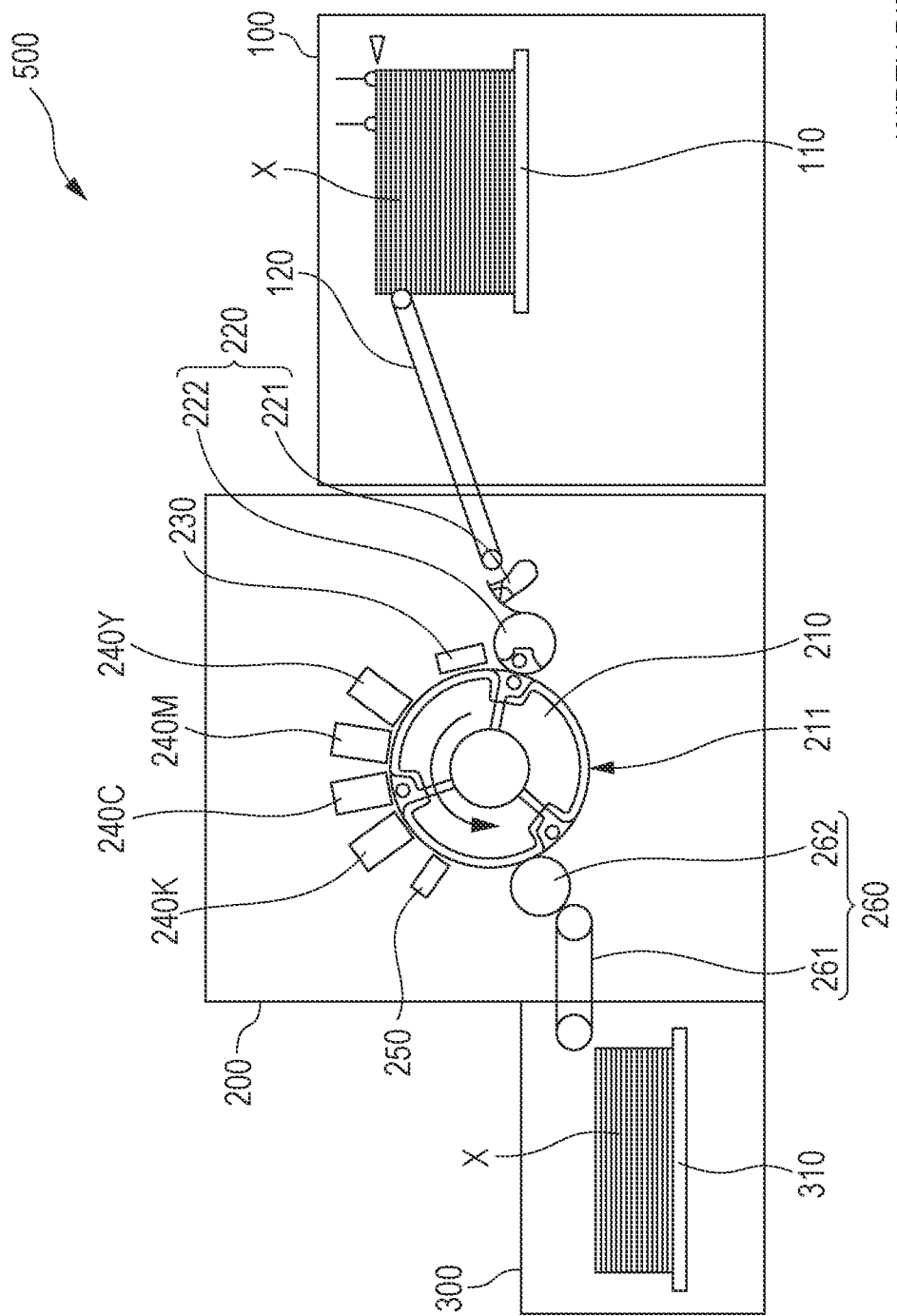
FIG. 1 is an explanatory diagram illustrating a schematic configuration of an inkjet recording apparatus according to the present embodiment.

FIG. 1 is an explanatory diagram illustrating a schematic configuration of the inkjet recording apparatus 500 according to the present embodiment. The inkjet recording apparatus 500 includes a sheet feeder 100, an image former 200, a sheet ejector 300, and an information processing apparatus 400 (see FIG. 2) to be described below.

Figure 2:
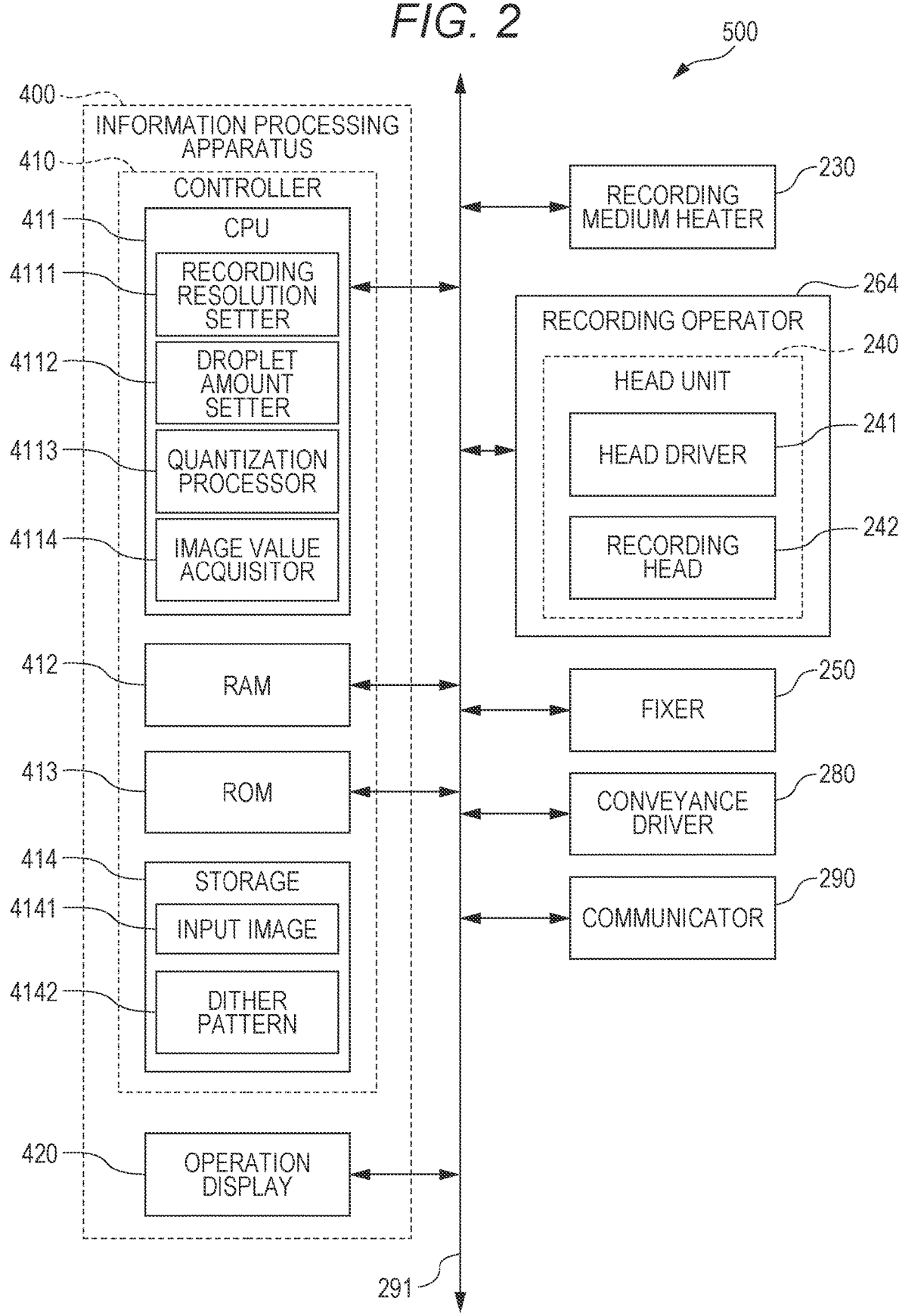
FIG. 2 illustrates a functional block diagram of the inkjet recording apparatus.

The inkjet recording apparatus 500 conveys a recording medium X stored in the sheet feeder 100 to the image former 200 under the control of a controller 410 of the information processing apparatus 400 illustrated in FIG. 2. The image former 200 forms an image on the recording medium X and conveys the recording medium X to the sheet ejector 300.

Note that, as the recording medium X, in addition to paper such as plain paper or coated paper, various media capable of fixing the ark landed on the surface, such as fabric or sheet-shaped resin, can be used.

The sheet feeder 100 includes a sheet feeding tray 110 and a medium supplier 120. The sheet feeding tray 110 stores the recording medium X and supplies the recording medium X to the image former 200. The medium supplier 120 includes a ring-shaped belt, which is not illustrated, and is supported by two rollers, which are not illustrated. The medium supplier 120 rotates the rollers in a state where the recording medium X is placed, and conveys the recording medium X from the sheet feeding tray 110 to the image former 200.

The image former 200 includes a conveying drum 210, a transfer unit 220, a recording medium heater 230, head units 240Y, 240M, 240C, and 240K, a fixer 250, and a deliverer 260.

The conveying drum 210 rotates about a rotation axis extending in an axial direction (see an arrow in FIG. 1) in a state of holding the recording medium X on a conveying surface 211, which is an outer peripheral surface having a cylindrical surface shape. Thus, the conveying drum 210 conveys the recording medium X along the conveying surface 211. Note that the conveying drum 210 is connected to a conveying drum motor, which is not illustrated, and rotates an angle proportional to the rotation amount of the conveying drum motor.

The transfer unit 220 sends the recording medium X conveyed from the medium supplier 120 of the sheet feeder 100 to the conveying drum 210. The transfer unit 220 is provided between the medium supplier 120 of the sheet feeder 100 and the conveying drum 210. The transfer unit 220 includes a swing arm 221 and a transfer drum 222, holds and picks up one end of the recording medium X conveyed from the medium supplier 120 with the swing arm 221, and sends the recording medium X to the conveying drum 210 via the transfer drum 222.

The recording medium heater 230 is provided between the arrangement position of the transfer drum 222 and the arrangement positions of the head units 240Y, 240M, 240C, and 240K. The recording medium heater 230 includes, for example, an infrared heater, which is not illustrated, and heats the recording medium X conveyed by the conveying drum 210 so as to fall within a predetermined temperature range.

The head units 240Y, 240M, 240C, and 240K discharge ink onto the recording medium X from an ink discharge surface facing the conveying surface 211 of the conveying drum 210 at an appropriate timing according to the rotation of the conveying drum 210 holding the recording medium X and record an image. In the head units 240Y, 240M, 240C, and 240K, the ink discharge surface and the conveying surface 211 are arranged to be spaced apart by a predetermined distance.

In the inkjet recording apparatus 500 according to the present embodiment, four head units corresponding to the inks of four colors: yellow (Y), magenta (M), cyan (C), and key plate (K) are arranged at predetermined intervals in the order of Y, M, C, and K colors from the upstream side in the conveyance direction of the recording medium X. Note that the inkjet recording apparatus 500 according to the present embodiment is an example, and the color combination, the order of arrangement, and the like are arbitrary components and are not particularly limited.

The fixer 250 includes an ultraviolet emitter (not illustrated) arranged over the width of the conveying drum 210 in a width direction. The fixer 250 irradiates the recording medium X placed on the conveying drum 210 with ultraviolet light from the ultraviolet emitter to cure and fix the ink discharged on the recording medium X. The ultraviolet emitter of the fixer 250 is arranged to face the conveying surface 211 between the arrangement positions of the head units 240Y, 240M, 240C, and 240K and the arrangement position of a transfer drum 262 of the deliverer 260 in the conveyance direction.

The deliverer 260 includes a belt loop 261 and the transfer drum 262. The deliverer 260 conveys the recording medium X transferred from the conveying drum 210 onto the belt loop 261 by the transfer drum 262, and sends the recording medium X to the sheet ejector 300.

The sheet ejector 300 includes a sheet ejecting tray 310. The sheet ejector 300 causes the deliverer 260 to place the recording medium X sent from the image former 200 on the sheet ejecting tray 310.

[Functional Block of Image Forming Apparatus]

FIG. 2 illustrates a functional block diagram of the inkjet recording apparatus 500. Note that the same configurations are denoted by the same reference numerals, and the description thereof will be omitted as appropriate.

The inkjet recording apparatus 500 includes the information processing apparatus 400, the recording medium heater 230, a recording operator 264, the fixer 250, a conveyance driver 280, a communicator 290, and a bus 291.

The information processing apparatus 400 includes the controller 410 and an operation display 420. The controller 410 controls the overall operation of the inkjet recording apparatus 500 including the information processing apparatus 400. The controller 410 includes, for example, a central processing unit (CPU) 411, random access memory (RAM) 412, read only memory (ROM) 413, and a storage 414. The storage 414 stores an input image 4141 and a dither pattern 4142.

The CPU 411 reads various control programs and setting data stored in the ROM 413, causes the RAM 412 to store them, and execute the programs to perform various arithmetic processing. The CPU 411 embodies a recording resolution setter 4111, a droplet amount setter 4112 (setter), a quantization processor 4113, and an image value acquisitor 4114.

The recording resolution setter 4111 sets a plurality of recording resolutions in a predetermined direction. Note that the predetermined direction is the conveyance direction of the recording medium.

The quantization processor 4113 quantizes each pixel with a dither pattern divided according to the resolution in the predetermined direction. The quantization processor 4113 increases the quantization number as the resolution in the predetermined direction is higher. In addition, the quantization processor 4113 can collectively quantize the values of the pixels quantized with the resolution in the predetermined direction for a plurality of pixels orthogonal to the predetermined direction. The quantization processor 4113 may change the position of each pixel referred to by each dither pattern according to the position in the direction orthogonal to the predetermined direction.

The droplet amount setter 4112 sets the droplet amount of a recording head 242 of each pixel by adding up the processing results of the quantization processor 4113. Here, the droplet amount of the recording head 242 of each pixel is the recording amount to each pixel. That is, the droplet amount setter 4112 sets the droplet amount of the recording head 242 according to the set recording amount of each pixel.

The image value acquisitor 4114 acquires a pixel value of each pixel of the input image 4141 stored in the storage 414.

The RAM 412 is a volatile memory, provides a working memory space for the CPU 411, and stores temporary data. The RAM 412 may include, for example, a nonvolatile memory.

The ROM 413 is a nonvolatile memory, and stores various control programs executed by the CPU 411, setting data, and the like. Note that the controller 410 may include a rewritable nonvolatile memory such as flash memory instead of the ROM 413.

The storage 414 is a mass storage device, and includes, for example, a hard disk drive (HDD), dynamic random access memory (DRAM), or the like.

The operation display 420 displays a status, an operation menu, and the like of the inkjet recording apparatus 500 according to a control signal from the controller 410, receives an input operation of the user, and outputs the input operation to the controller 410. The operation display 420 is provided on a display screen with, for example, a touch panel for sensing a contact operation of a user, and constitutes a liquid crystal display.

With such a configuration, the information processing apparatus 400 performs, for example, various types of image processing on page description language (PDL) data input from an external device via the communicator. Then, the information processing apparatus 400 generates the input image 4141 used to form an image and causes the storage 414 to store the input image 4141. The input image 4141 is generated, for example, for each color of Y, M, C, and K.

The conveyance driver 280 supplies a drive signal to the conveying drum motor of the conveying drum 210 based on the control signal supplied from the controller 410, thereby rotating the conveying drum 210 at a predetermined speed and timing. In addition, the conveyance driver 280 supplies a drive signal to a motor for operating the medium supplier 120, the transfer unit 220, and the deliverer 260 on the basis of the control signal supplied from the controller 410, and causes the recording medium X to be supplied to the conveying drum 210 and discharged from the conveying drum 210.

The communicator 290 is a communication interface that controls a communication operation with external equipment. Examples of the communication interface include those compatible with various communication protocols such as a LAN board and a LAN card. The communicator 290 acquires image data to be recorded and setting data (job data) related to image recording from an external device on the basis of control of the controller 410, and transmits status information and the like to the external equipment.

The bus 291 is a path for exchanging signals by electrically connecting the above-described configurations.

The recording operator 264 includes the head units 240Y, 240M, 240C, and 240K and the like. The recording operator 264 may further include a carriage, a carriage lift, and the like. The head units 240Y 240M, 240C, and 240K each include a head driver 241 and the recording head 242 corresponding to each color.

The head driver 241 supplies a drive signal for deforming and operating the piezoelectric body of the recording head 242 to the recording head 242 on the basis of the control signal supplied from the controller 410 and the input image 4141. The recording head 242 discharges a plurality of droplet amounts to each pixel.

In FIG. 2, any of the colors of the head units 240Y, 240M, 240C, and 240K is not specified, and they are simply described as the head unit 240. Any of the head units 240Y, 240M, 240C, and 240K can adopt the same configuration as the head unit 240.

First Embodiment

First Example

[Operation of Inkjet Recording Apparatus]

The operation of the inkjet recording apparatus 500 according to the present embodiment will be described.

Figure 3:
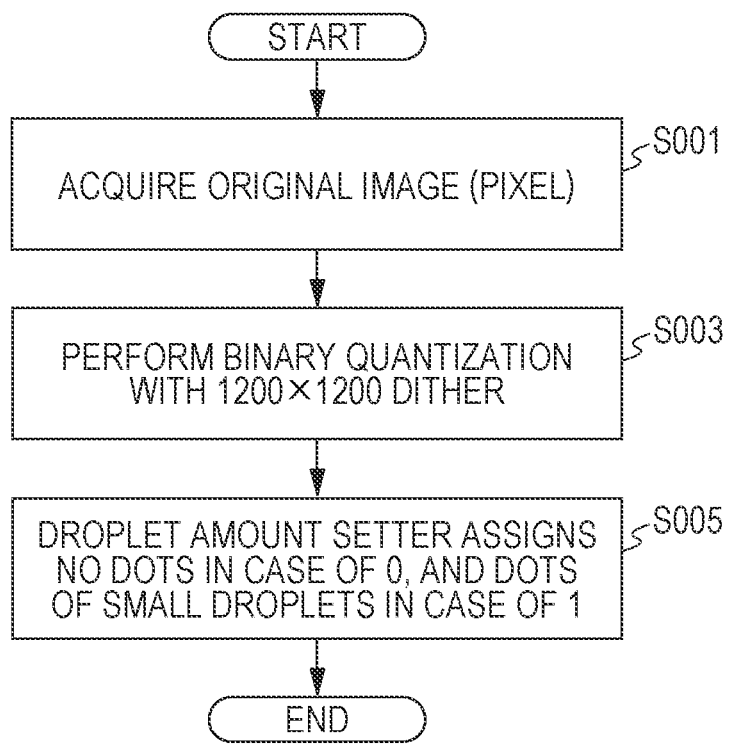
FIG. 3 is a flowchart illustrating processing in which the inkjet recording apparatus according to the present embodiment executes binary quantization with a 1200×1200 [dpi] dither pattern.

FIG. 3 is a flowchart illustrating processing in which the inkjet recording apparatus 500 according to the present embodiment executes binary quantization with a 1200×1200 [dpi] dither pattern. Note that the dither pattern is also simply referred to as a dither.

The image value acquisitor 4114 acquires each pixel value (input pixel value 600) of the original image from the input image 4141 of the storage 414 (step S001). The recording resolution setter 4111 sets a recording resolution of 1200× 1200 [dpi] in the conveyance direction (predetermined direction).

The quantization processor 4113 quantizes each pixel with a dither pattern of 1200×1200 [dpi] (step S003).

As described above, since the quantization processor 4113 sets the recording resolution of 1200 [dpi] in the conveyance direction with the recording resolution setter 4111, binary quantization can be performed for each pixel using the 1200×1200 [dpi] dither pattern.

The droplet amount setter 4112 assigns no dots in the off ("0") case, and dots of small droplets in the on ("1") case (step S005). Then, the processing of the flowchart of FIG. 3 ends.

Figure 4:
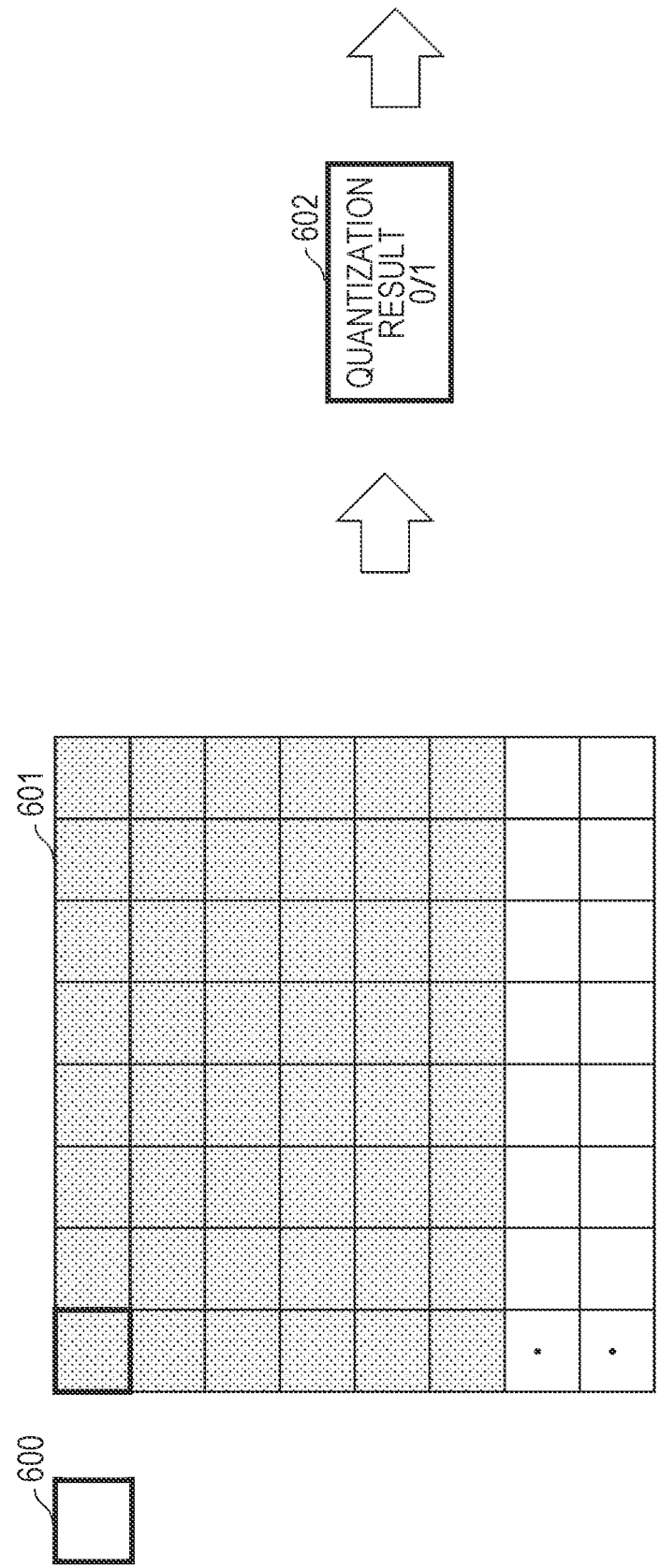
FIG. 4 is a conceptual diagram illustrating processing in which a quantization processor performs binary quantization.

FIG. 4 is a conceptual diagram illustrating processing in which the quantization processor 4113 performs binary quantization. Note that the input pixel value 600 is represented by 16-bit gradation.

The quantization processor 4113 performs quantization with an input range to a 1200×1200 [dpi] dither pattern 601 set to, for example, 0 to 65534 (256×256 size).

Thus, the droplet amount setter 4112 sets on ("1") when the input pixel value 600 is larger than this, and sets off ("0") when the input pixel value 600 is equal to or less than this. That is, the droplet amount setter 4112 can assign no dots in the off ("0") case, and dots of small droplets in the on ("1") case.

Second Example

Figure 5:
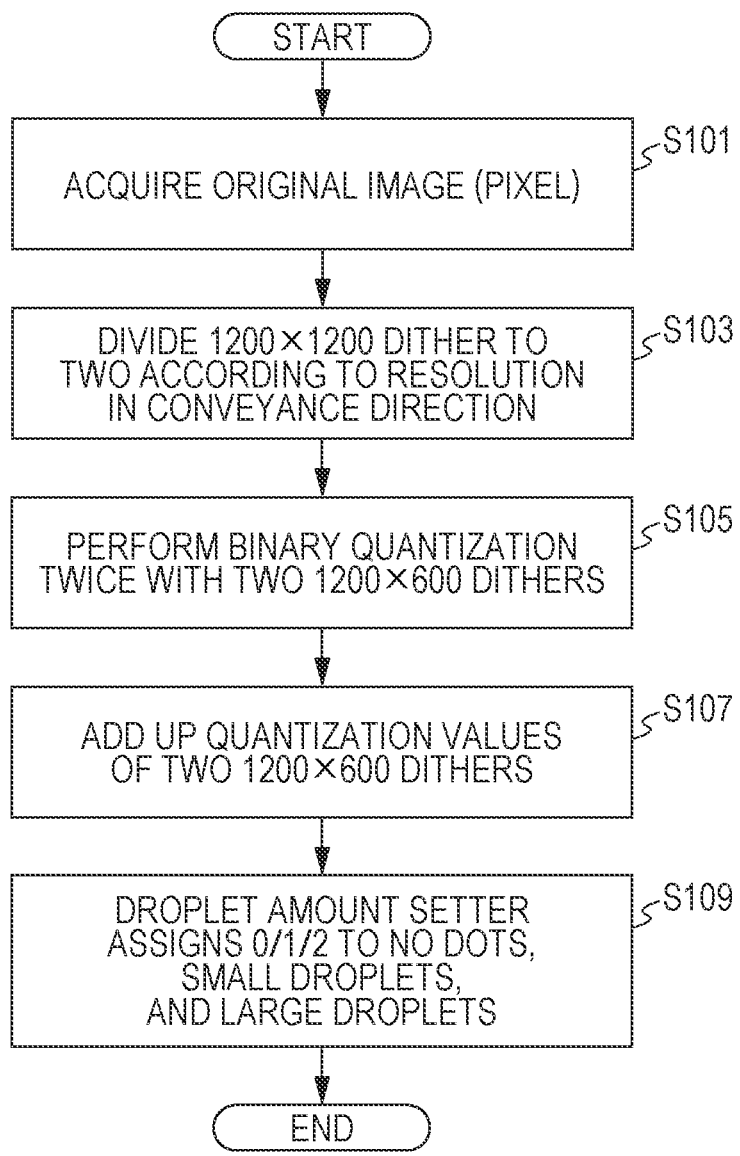
FIG. 5 is a flowchart illustrating processing in which the inkjet recording apparatus according to the present embodiment divides a 1200×1200 [dpi] dither pattern into two, executes binary quantization using the divided dither patterns, and then adds up values of recording pixels.

FIG. 5 is a flowchart illustrating processing in which the inkjet recording apparatus 500 according to the present embodiment divides a 1200×1200 [dpi] dither pattern into two, executes binary quantization using the divided dither patterns, and then adds up values of recording pixels.

The image value acquisitor 4114 acquires an input pixel value 603 of the original image from the input image 4141 of the storage 414 (step S101). The recording resolution setter 4111 sets a recording resolution of 1200 [dpi] according to the conveyance direction.

The quantization processor 4113 divides the 1200×1200 [dpi] dither pattern into two according to the resolution in the conveyance direction (step S103). Then, the quantization processor 4113 performs binary quantization with the two divided dither patterns (virtual 1200×600 [dpi] dithers). (step S105)

The droplet amount setter 4112 adds up the processing results of the two dither patterns (virtual 1200×600 [dpi] dithers) by the quantization processor 4113 (quantization result 607), and sets the recording amount of each pixel (step S107).

Accordingly, when the droplet amount setter 4112 assigns 0/1/2 to no dots, small droplet, and large droplet (step S109), the processing of the flowchart of FIG. 5 ends.

Figure 6:
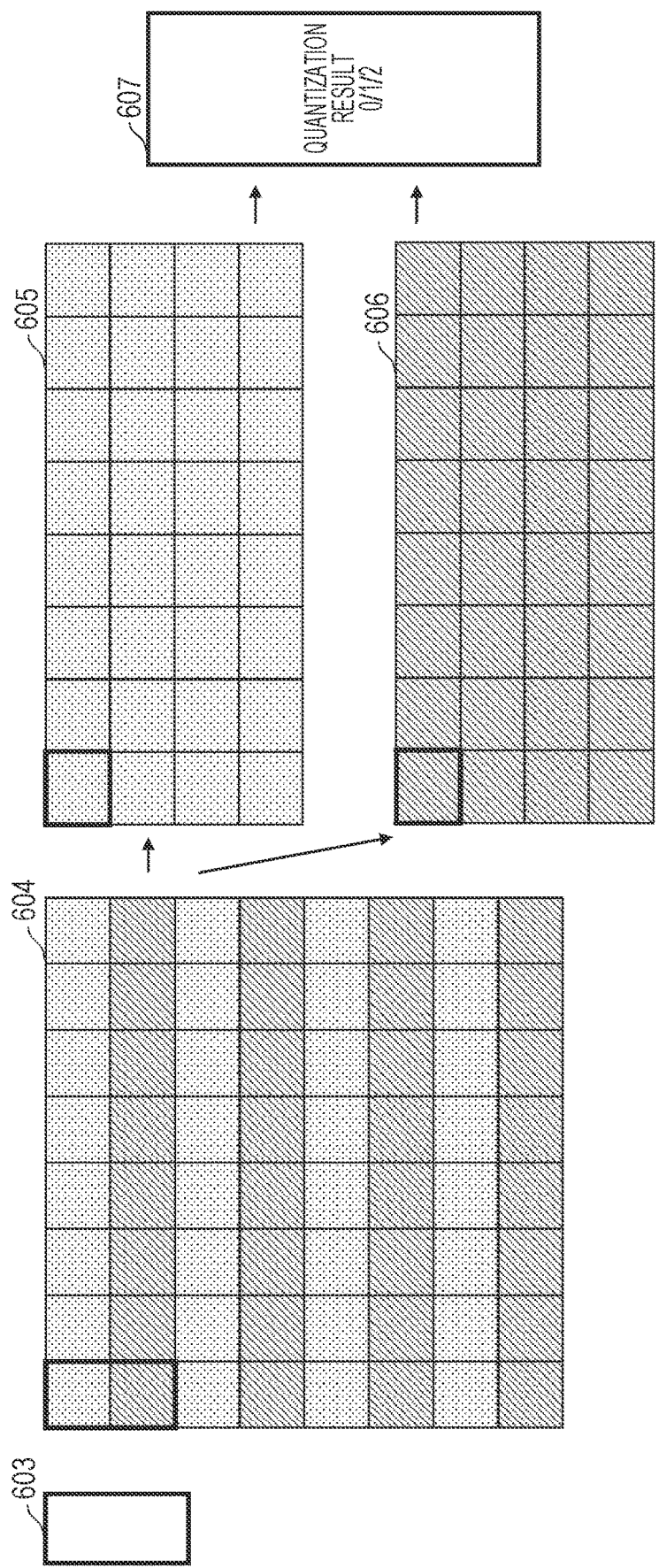
FIG. 6 is a conceptual diagram illustrating processing in which a quantization processor executes binary quantization with a virtual 1200×600 [dpi] dither pattern and then adds up values of recording pixels.

FIG. 6 is a conceptual diagram illustrating processing in which the quantization processor 4113 executes binary quantization with a virtual 1200×600 [dpi] dither pattern and then adds up values of recording pixels.

In a case of printing at a recording resolution of 1200×600 [dpi], the quantization processor 4113 divides a 1200×1200 [dpi] dither pattern 604 into two: a virtual 1200×600 [dpi] dither pattern 605 and a virtual 1200×600 [dpi] dither pattern 606.

Then, the quantization processor 4113 performs binary quantization twice with respect to the input pixel value 603 with the virtual 1200×600 [dpi] dither pattern 605 and the virtual 1200×600 [dpi] dither pattern 606.

In a case where the original pixels are prepared at 1200×600 [dpi] by the previous step, it is sufficient if the quantization processor 4113 refers to with the same value twice. Alternatively, with respect to data for which the original pixels are prepared at 1200×1200 [dpi], in the case of operation in which the printing resolution is selected to 1200×600 [dpi], each pixel may be assigned to the divided dithers.

In this manner, the difference in recording resolution and the spatial frequency characteristic at the time of designing the dither pattern can be matched in the resolution range of 1200×600 [dpi]. As a result, the same dither pattern can be assigned to a plurality of resolutions with a simple configuration.

The droplet amount setter 4112 adds up the processing results of the virtual 1200×600 [dpi] dither pattern 605 and the virtual 1200×600 [dpi] dither pattern 606 (quantization result 607), and sets the recording amount of each pixel according to the quantization result 607.

Accordingly, the droplet amount setter 4112 can assign no output in the off ("0") case, small droplets in the case of "1", and large droplets in the case of "2".

As described above, the quantization processor 4113 refers to with the same value twice according to the recording resolution (1200×600 [dpi]) set by the recording resolution setter 4111. Note that, with respect to data for which the input pixel value 603 is prepared at 1200×1200 [dpi], in the case of operation in which the recording resolution is selected to 1200×600 [dpi], the quantization processor 4113 may assigns the divided dither patterns to each pixel.

Thus, the information processing apparatus 400 can match the difference in recording resolution and the spatial frequency characteristic at the time of designing the dither in the resolution range of 1200×600 [dpi]. As a result, the inkjet recording apparatus 500 can assign the same dither pattern to a plurality of recording resolutions.

Third Example

Figure 7:
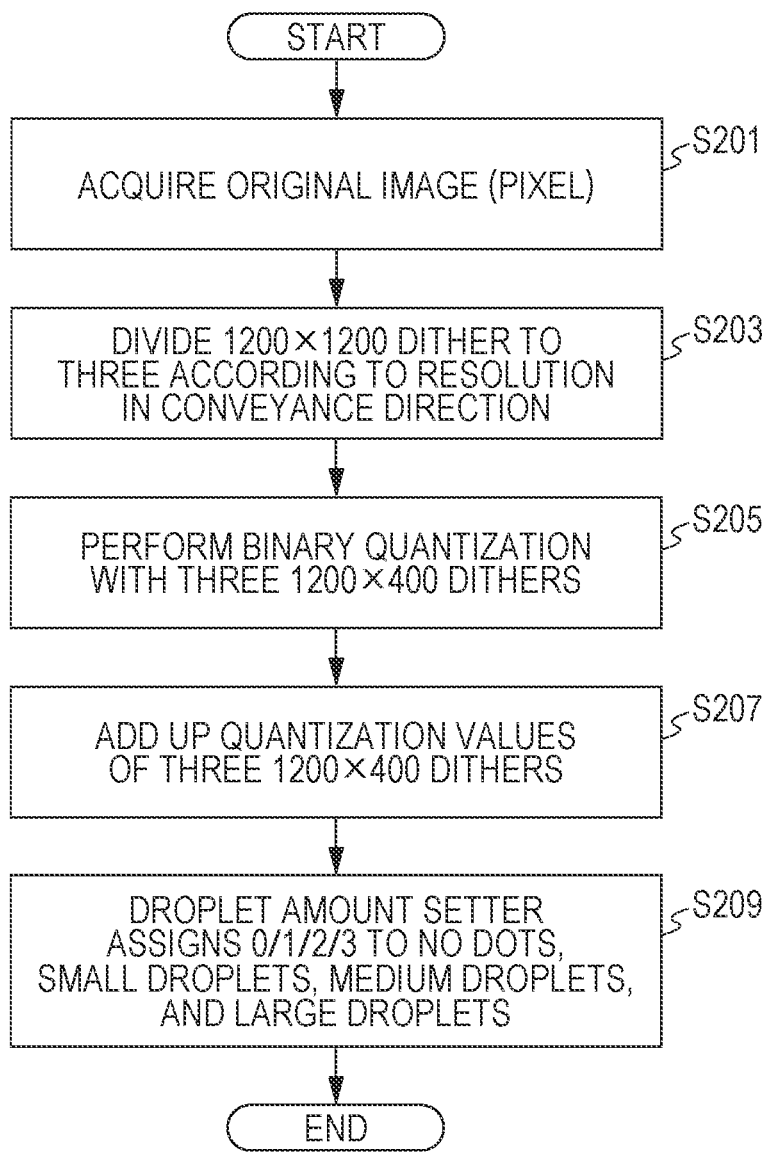
FIG. 7 is a flowchart illustrating processing in which the inkjet recording apparatus according to the present embodiment divides a 1200×1200 [dpi] dither pattern into three, executes binary quantization using the divided dither patterns, and then adds up values of recording pixels.

FIG. 7 is a flowchart illustrating processing in which the inkjet recording apparatus 500 according to the present embodiment divides a 1200×1200 [dpi] dither pattern into three, executes binary quantization using the divided dither patterns, and then adds up values of recording pixels.

The image value acquisitor 4114 acquires an input pixel value 608 of the original image from the input image 4141 of the storage 414 (step S2011. The recording resolution setter 4111 sets a recording resolution of 1200 [dpi] according to the conveyance direction.

The quantization processor 4113 divides the 1200×1200 [dpi] dither pattern into three according to the resolution in the conveyance direction (step S203). Then the quantization processor 4113 performs binary quantization with the divided three dither patterns (virtual 1200×400 [dpi] dithers). (step S205)

The droplet amount setter 4112 adds up the processing results of the three dither patterns (virtual 1200×400 [dpi] dithers) by the quantization processor 4113 (quantization result 613), and sets the recording amount of each pixel (step S207).

Accordingly, the droplet amount setter 4112 assigns no output in the off ("0") case, small droplets in the case of "1", medium droplets in the case of "2", and large droplets in the case of "3" (step S209). Then the processing of the flowchart of FIG. 7 ends.

Figure 8:
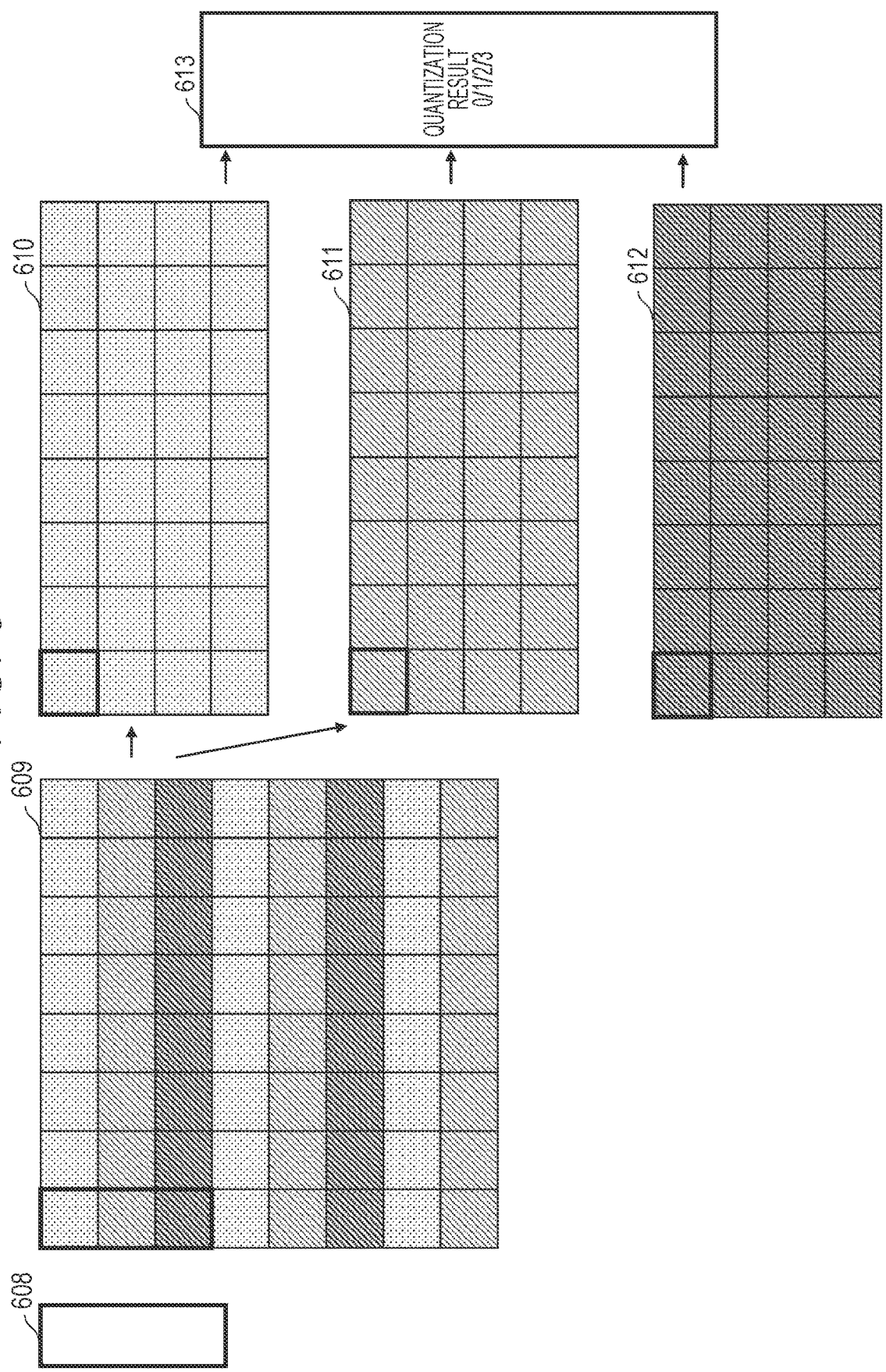
FIG. 8 is a conceptual diagram illustrating processing in which a quantization processor executes binary quantization with a virtual 1200×400 [dpi] dither pattern and then adds up values of recording pixels.

FIG. 8 is a conceptual diagram illustrating processing in which the quantization processor 4113 executes binary quantization with a virtual 1200×400 [dpi] dither pattern and then adds up values of recording pixels.

In a case of printing at a recording resolution of 1200×400 [dpi], the quantization processor 4113 divides a 1200×1200 [dpi] dither pattern 609 into three: a virtual 1200×400 [dpi] dither pattern 610, a virtual 1200×400 [dpi] dither pattern 611, and a virtual 1200×400 [dpi] dither pattern 612.

Then, the quantization processor 4113 performs binary quantization three times with respect to the input pixel value 608 with the virtual 1200×400 [dpi] dither pattern 610, the virtual 1200×400 [dpi] dither pattern 611, and the virtual 1200×400 [dpi] dither pattern 612.

The droplet amount setter 4112 adds up the processing results of the virtual 1200×400 [dpi] dither pattern 610, the virtual 1200×400 [dpi] dither pattern 611, and the virtual 1200×400 [dpi] dither pattern 612 (quantization result 613), and sets the recording amount of each pixel according to the quantization result 613.

Accordingly, the droplet amount setter 4112 assigns no output in the off ("0") case, small droplets in the case of "1", medium droplets in the case of "2", and large droplets in the case of "3".

As described above, the quantization processor 4113 refers to with the same value three times according to the recording resolution (1200×400 [dpi]) set by the recording resolution setter 4111. Note that, with respect to data for which the input pixel value 608 is prepared at 1200×1200 [dpi], in the case of operation in which the recording resolution is selected to 1200×400 [dpi], the quantization processor 4113 may assigns the divided dither patterns to each pixel.

Second Embodiment

Fourth Example

Figure 9:
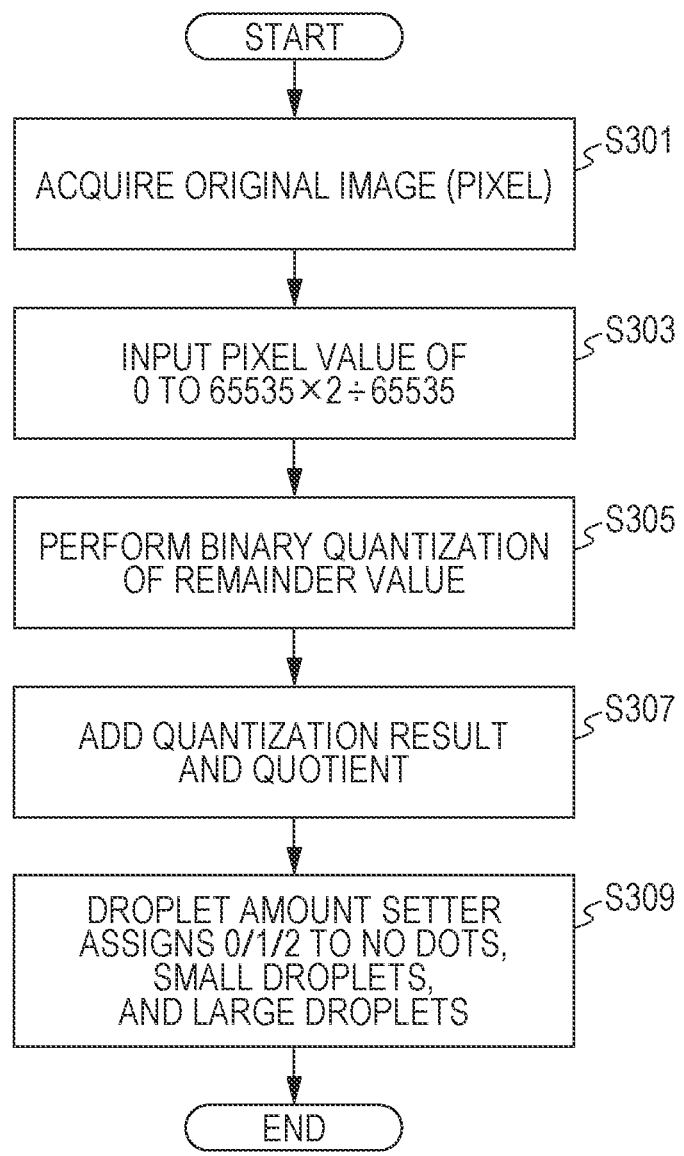
FIG. 9 is a flowchart of a modification illustrating processing in which an inkjet recording apparatus according to the present embodiment executes binary quantization with a binary 1200×1200 [dpi] dither pattern, and then adds up values of recording pixels.

FIG. 9 is a flowchart of a modification illustrating processing in which an inkjet recording apparatus 500 according to the present embodiment executes binary quantization with a binary 1200×1200 [dpi] dither pattern, and then adds up values of recording pixels.

An image value acquisitor 4114 acquires each pixel value (input pixel value 600) of the original image from an input image 4141 of a storage 414 (step S301). A recording resolution setter 4111 sets a recording resolution of 1200× 1200 [dpi] in a conveyance direction.

A quantization processor 4113 doubles the input pixel value 600 and divides it by 65535 (step S303). Note that the input pixel value 600 is 0 to 65535.

Then, the quantization processor 4113 quantizes the remainder value with a binary 1200×1200 [dpi] dither pattern (step S305).

A droplet amount setter 4112 adds the processing result of the quantization processor 4113 and the quotient, and sets the recording amount of each pixel by ternary quantization (step S307).

Accordingly, the droplet amount setter 4112 assigns no output in the off ("0") case, small droplets in the case of "1", and large droplets in the case of "2" (step S309). Then, the processing of the flowchart of FIG. 9 ends.

Figure 10:
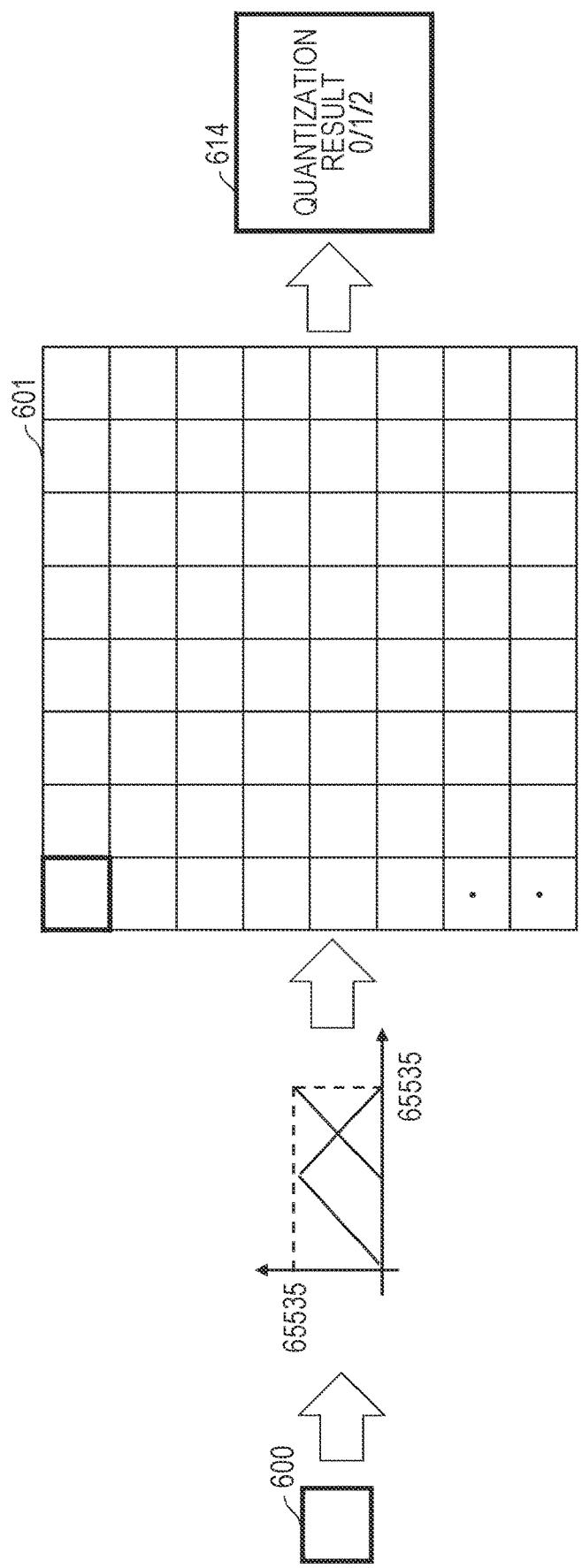
FIG. 10 is a conceptual diagram illustrating processing in which a quantization processor performs ternary quantization using a binary 1200×1200 [dpi] dither pattern.

FIG. 10 is a conceptual diagram illustrating processing in which the quantization processor 4113 performs ternary quantization using a binary 1200×1200 [dpi] dither pattern.

The quantization processor 4113 doubles the input pixel value 600, divides it by 65535, and then quantizes the remainder value with a binary 1200×1200 [dpi] dither pattern 601. The droplet amount setter 4112 adds the quotient to the quantization result (quantization result 614), and sets the recording amount of each pixel according to the quantization result 614.

Accordingly, the droplet amount setter 4112 assigns no output in the off ("0") case, small droplets in the case of "1", and large droplets in the case of "2".

When high-speed processing is performed by changing the recording resolution with the inkjet recording apparatus 500, it is necessary to consider that the resolution is different. According to the present embodiment, it is possible to easily achieve appropriate quantization of a plurality of recording resolutions using one dither pattern. In addition, it is not necessary to prepare a dot pattern after quantization processing as indicated in the conventional example.

In addition, in the inkjet recording apparatus 500, in general, the cycle of discharge from a recording head 242 is not often changed, and the recording speed is often changed by sub-scanning resolution. In this case, the recording resolution is changed while maintaining the amount of dischargeable liquid for each sub-scanning recording unit.

In the inkjet recording apparatus 500, the quantization number on the high resolution side is set to be relatively larger than the quantization number on the low resolution side. Thus, it is possible to equalize the quantization number in units of recording pixels at any resolution. In addition, the inkjet recording apparatus 500 can perform quantization processing that effectively uses the usable droplet size, such as performing printing with higher density at the time of high-resolution printing. Further, the number of divisions is relatively reduced, and the types of droplet sizes that can be used in the printing mode having a relatively high recording resolution can be increased.

When the one-pass recording method by inkjet has a plurality of printing modes having different sheet conveyance speeds, the amount of dischargeable droplets at a printing resolution corresponding to each printing mode is often substantially constant while maintaining the discharge cycle of the inkjet head. In such a case, even if the quantization number of the high resolution is relatively high, it is possible to eject the droplet amount equivalent to that at the low resolution to one recording pixel. Therefore, the droplet amount that is possible in the discharge cycle of the head can be effectively used.

As a result, the dynamic range of the recording density can be expanded according to the relatively high resolution. In addition, robustness due to variations of dots with respect to printing unevenness can be improved. Note that high-speed recording is possible at the time of low resolution.

Third Embodiment

Fifth Example

In the fifth example, adjacent pixels in a nozzle array direction are collectively quantized again. In this case, it is sufficient if at least two pixels are collected, and for example, a droplet amount setter 4112 can collect "0", "1", and "2" and "0", "1" and "2" to put them into two "0", "1", and "2" again.

Figure 11:
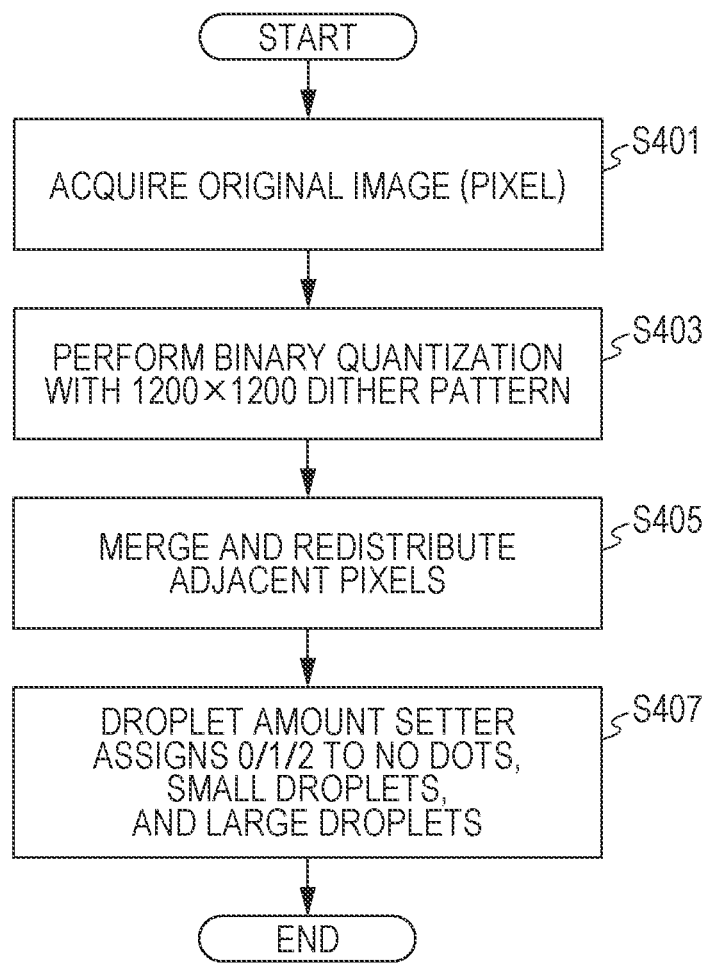
FIG. 11 is a flowchart illustrating processing in which the inkjet recording apparatus according to the present embodiment executes binary quantization with a 1200×1200 [dpi] dither pattern, and merges and redistributes adjacent pixels.

FIG. 11 is a flowchart illustrating processing in which an inkjet recording apparatus 500 according to the present embodiment executes binary quantization with a 1200×1200 [dpi] dither pattern, and merges and redistributes adjacent pixels.

The image value acquisitor 4114 acquires each pixel value of the original image from an input image 4141 of a storage 414 (step S401). A recording resolution setter 4111 sets a recording resolution of 1200 [dpi] according to the conveyance direction.

A quantization processor 4113 executes binary quantization of each pixel with a 1200×1200 [dpi] dither pattern (step S403).

A droplet amount setter 4112 merges and redistributes adjacent pixels (step S405). Then, the droplet amount setter 4112 assigns no output in the off ("0") case, small droplets in the case of "1", and large droplets in the case of "2" (step S407), and the processing of the flowchart of FIG. 11 ends.

Figure 12A:
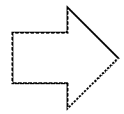
FIG. 12A is an explanatory diagram illustrating a concept of merging and redistributing adjacent pixels in step S405 (part 1)
Figure 12B:
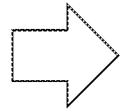
FIG. 12B is an explanatory diagram illustrating a concept of merging and redistributing adjacent pixels in step S405 (part 2)

FIGS. 12A and 12B are explanatory diagrams illustrating a concept of merging and redistributing adjacent pixels P1 and P2 in step S405.

In FIG. 12A, regarding the adjacent pixels P1 and P2, when the adjacent pixel P1 and the adjacent pixel P2 are merged, in a case where "0" is included in any one of the adjacent pixel P1 and the adjacent pixel P2, the merging is performed as it is. On the other hand, when both the adjacent pixel P1 and the adjacent pixel P2 are "1", "1" is added to one adjacent pixel P1$a$, and "1" is subtracted from the other adjacent pixel P2$a$.

As a result, as illustrated in FIG. 12A, when both the adjacent pixel P1 and the adjacent pixel P2 are "1" and redistribution is performed, the adjacent pixel P1$a$ becomes "2" and the adjacent pixel P2$a$ becomes "0".

In addition, in the case of FIG. 12B, the values to be redistributed are changed, and when the redistribution is performed in a case where both the adjacent pixel P1 and the adjacent pixel P2 are "1", the adjacent pixel P1$a$ becomes "0" and the adjacent pixel P2$a$ becomes "2".

As described above, in the fifth example, the adjacent pixels are once merged and distributed to one of them. Note that this is not the only example, and a plurality of pixels may be collected again and the quantization values may be distributed with respect to a combination of adjacent dots in which the influence of image quality defects such as landing errors is concerned. Thus, it is possible to suppress streaks caused by a dot landing error or the like.

Third Embodiment

Sixth Example

FIG. 13 is a flowchart illustrating processing in which an inkjet recording apparatus 500 according to the present embodiment further merges and redistributes adjacent pixels with respect to the fourth example of the second embodiment.

An image value acquisitor 4114 acquires a plurality of pixels adjacent in a nozzle array direction from an input image 4141 of a storage 414 (step S501). A recording resolution setter 4111 sets a recording resolution of 1200 [dpi] in a conveyance direction.

A quantization processor 4113 doubles an input pixel value and divides it by 65535 (step S503).

Then, the quantization processor 4113 executes quantization of the remainder value with a binary 1200×1200 [dpi] dither pattern (step S505).

The droplet amount setter 4112 adds the processing result of the quantization processor 4113 and the quotient (step S507).

The droplet amount setter 4112 merges and redistributes adjacent pixels (step S509). Then, the droplet amount setter 4112 assigns no output in the off ("0") case, small droplets in the case of "1", and large droplets in the case of "2" (step S511), and the processing of the flowchart of FIG. 13 ends.

FIGS. 14A and 14B are explanatory diagrams illustrating a concept of merging and redistributing adjacent pixels P1 and P2 in step S509.

Note that FIGS. 14A and 14B are different from FIGS. 12A and 12B in that ternary quantization is executed at the stage before merging. Therefore, when the quantization values of the adjacent pixels P1 and P2 are "0" and "2", the same values are taken as they are. On the other hand, in a case where the quantization values of the adjacent pixels P1 and P2 are both "1", they are distributed to one of them.

In FIG. 14A, similarly to FIG. 12A, regarding the adjacent pixels P1 and P2, when the adjacent pixel P1 and the adjacent pixel P2 are merged, in a case where neither the adjacent pixel P1 nor the adjacent pixel P2 is "1", the merging is performed as it is. On the other hand, when both the adjacent pixel P1 and the adjacent pixel P2 are "1", "1" is added to one adjacent pixel P1$a$, and "1" is subtracted from the other adjacent pixel P2$a$.

As a result, as illustrated in FIG. 14A, when both the adjacent pixel P1 and the adjacent pixel P2 are "1" and redistribution is performed, the adjacent pixel P1$a$ becomes "2" and the adjacent pixel P2$a$ becomes "0".

In addition, in the case of FIG. 14B, the values to be redistributed are changed and when the redistribution is performed in a case where both the adjacent pixel P1 and the adjacent pixel P2 are "1", the adjacent pixel P1$a$ becomes "0" and the adjacent pixel P2$a$ becomes "2".

As described above, in the sixth example, the fourth example and the fifth example can be combined, and adjacent pixels can be once merged and distributed to one of them. Thus, in the sixth example, similarly to the fifth example, a plurality of pixels can be collected again and the quantization values can be distributed with respect to a combination of adjacent dots in which the influence of image quality defects such as landing errors is concerned.

Fourth Embodiment

Seventh Example

Figure 15:
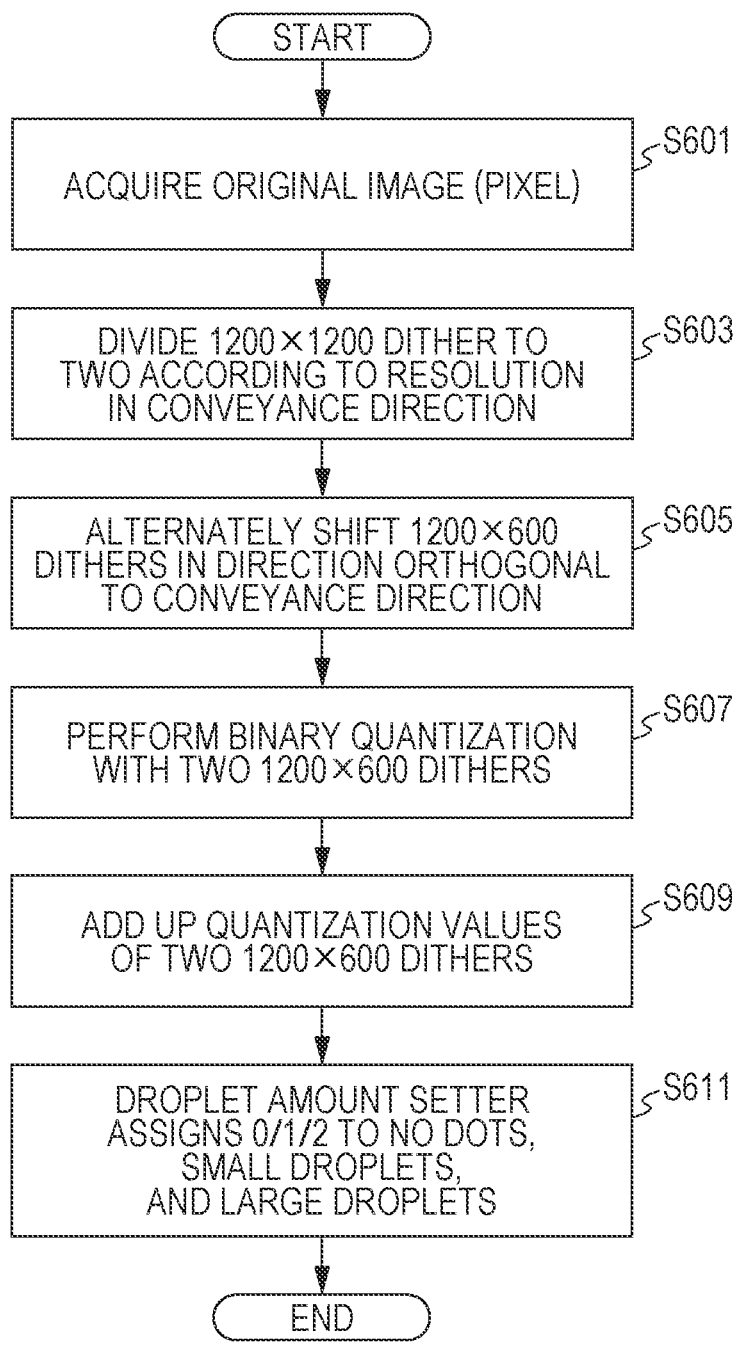
FIG. 15 is a flowchart illustrating processing in which two divided dither patterns are alternately shifted in a direction orthogonal to a conveyance direction, binary quantization is executed, and then values of recording pixels are added up.

FIG. 15 is a flowchart illustrating processing in which two divided dither patterns are alternately shifted in a direction orthogonal to a conveyance direction, binary quantization is executed, and then values of recording pixels are added up.

An image value acquisitor 4114 acquires an input pixel value 603 of the original image from an input image 4141 of a storage 414 (step S601). A recording resolution setter 4111 sets a recording resolution of 1200 [dpi] according to the conveyance direction.

A quantization processor 4113 divides a 1200×1200 [dpi] dither pattern 604 into two according to the resolution in the conveyance direction (step S603).

Then, the quantization processor 4113 alternately shifts two divided dither patterns (virtual 1200×600 [dpi] dithers) 605 and 606 in the direction orthogonal to the conveyance direction (step S605).

In addition, after the quantization processor 4113 executes the binary quantization with the two dither patterns (virtual 1200×600 [dpi] dithers) 605 and 606 (step S607), a droplet amount setter 4112 adds up the processing results of the two dither patterns (virtual 1200×600 [dpi] dithers) 605 and 606 by the quantization processor 4113 and sets the recording amount of each pixel (step S609).

The droplet amount setter 4112 assigns no output in the off ("0") case, small droplets in the case of "1", and large droplets in the case of "2" (step S611). Then, the flowchart of FIG. 15 ends.

FIG. 16 is a conceptual diagram illustrating processing in which the quantization processor 4113 alternately shifts two divided virtual 1200×600 [dpi] dither patterns 605 and 606 in a direction orthogonal to a conveyance direction, executes binary quantization, and then performs adding up.

In a case of printing at 1200×600 [dpi], similarly to FIG. 6, the quantization processor 4113 divides the 1200×1200 [dpi] dither pattern 604 into two: the virtual 1200×600 [dpi] dither pattern 605 and the virtual 1200×600 [dpi] dither pattern 606.

Then, the quantization processor 4113 alternately shifts the virtual 1200×600 [dpi] dither pattern 605 and the virtual 1200×600 [dpi] dither pattern 606 in the direction orthogonal to the conveyance direction and performs quantization twice.

The droplet amount setter 4112 adds up the processing results of the virtual 1200×600 [dpi] dither pattern 605 and the virtual 1200×600 [dpi] dither pattern 606 (quantization result 607), and sets the recording amount of each pixel according to the quantization result 607. The droplet amount setter 4112 assigns no output in the off ("0") case, small droplets in the case of "1", and large droplets in the case of "2".

Thus, an inkjet recording apparatus 500 can disperse the collected dot recording positions of the recording head 242. For example, as compared with the case where the recording resolution is set to 1200×1200 [dpi], the recording resolution of 1200×600 [dpi] is reduced to ½ by the resolution of sub-scanning of print timing when viewed in units of one pixel. In this case, since the dots of the 1×2 area to be collected are not gathered to one side, it is possible to disperse relatively low-resolution image recording positions.

As a method of adapting an image to a dither, the resolution of an input image may be prepared on the high definition side, and each value may be applied to the divided dither according to the printing resolution. In addition, the same pixel value may be applied to the divided dither according to the printing resolution.

According to an embodiment of the present invention, the same dither matrix can be applied to a plurality of recording resolutions with a simple configuration.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a hardware processor that:
   acquires a selected recording resolution in a predetermined direction;
   divides, according to the selected recording resolution, a dither pattern having a spatial frequency characteristic designed for a resolution different from the selected recording resolution, to obtain a plurality of divided dither patterns having a spatial frequency characteristic matched to the selected recording resolution;
   quantizes each pixel with each of the plurality of divided dither patterns; and
   sets a recording amount of each pixel by adding up processing results of the quantization performed with each of the plurality of divided dither patterns.

2. The image forming apparatus according to claim 1, wherein the hardware processor increases a quantization number as the selected recording resolution in the predetermined direction is higher.

3. The image forming apparatus according to claim 1, wherein the hardware processor collectively quantizes values of pixels quantized with the selected recording resolution in the predetermined direction for a plurality of pixels orthogonal to the predetermined direction.

4. The image forming apparatus according to claim 1, wherein the hardware processor changes a position of each pixel referred to by each dither pattern according to a position in a direction orthogonal to the predetermined direction.

5. The image forming apparatus according to claim 1, wherein the predetermined direction is a conveyance direction of a recording medium.

6. The image forming apparatus according to claim 1, wherein the hardware processor further sets a plurality of recording resolutions in the predetermined direction.

7. The image forming apparatus according to claim 1, further comprising:
   a recording head capable of discharging a plurality of droplet amounts to each pixel.

8. The image forming apparatus according to claim 7, wherein the hardware processor sets a droplet amount of the recording head according to a set recording amount of each pixel.

9. A recording amount setting method of an image forming apparatus, the method comprising:
   acquiring a selected recording resolution in a predetermined direction;
   dividing, according to the selected recording resolution, a dither pattern having a spatial frequency characteristic designed for a resolution different from the selected recording resolution, to obtain a plurality of divided dither patterns having a spatial frequency characteristic matched to the selected recording resolution;
   quantizing each pixel with of the plurality of divided dither patterns; and
   setting a recording amount of each pixel by adding up processing results of the quantization performed with each of the plurality of divided dither patterns.

10. A non-transitory recording medium storing a computer readable recording amount setting program causing a computer to execute:
    acquiring a selected recording resolution in a predetermined direction;
    dividing, according to the selected recording resolution, a dither pattern having a spatial frequency characteristic designed for a resolution different from the selected recording resolution, to obtain a plurality of divided dither patterns having a spatial frequency characteristic matched to the selected recording resolution;
    quantizing each pixel with each of the plurality of divided dither patterns; and
    setting a recording amount of each pixel by adding up processing results of the quantization performed with each of the plurality of divided dither patterns.

* * * * *